United States Patent
Wilson et al.

[15] 3,676,749
[45] July 11, 1972

[54] SWITCH-OPERATING MECHANISM WITH PARTICULAR APPLICATION THEREOF TO POTENTIAL-TRANSFORMER DISCONNECTING ASSEMBLY

[72] Inventors: John R. Wilson, Darien; Sadig A. Shariff, Hickory Hills, both of Ill.

[73] Assignee: Westinghouse Electric Corporation, Pittsburgh, Pa.

[22] Filed: Oct. 28, 1970

[21] Appl. No.: 84,752

[52] U.S. Cl. .......................................... 317/103, 200/50 AA
[51] Int. Cl. ........................................ H02b 1/18, H01h 9/22
[58] Field of Search .......... 200/50 AA; 317/99, 112, 114–116

[56] References Cited

UNITED STATES PATENTS

| | | | |
|---|---|---|---|
| 2,795,739 | 6/1957 | Wood | 317/99 |
| 3,052,820 | 9/1962 | Kreekon | 317/99 |
| 3,157,827 | 11/1964 | Tjebben | 317/99 |

FOREIGN PATENTS OR APPLICATIONS

| | | | |
|---|---|---|---|
| 1,260,754 | 11/1961 | France | 200/50 AA |

Primary Examiner—Lewis H. Myers
Assistant Examiner—Gerald P. Tolin
Attorney—A. T. Stratton, Clement L. McHale and Willard R. Crout

[57] ABSTRACT

An improved switch-operating mechanism is provided for translating linear motion of an actuating member, such as a handle mechanism, for example, into the rotary motion of a tray, or other rotatable member, which may carry, for example, one or more rotatably-actuated switch members. The switch members may take the form of movable finger assemblies, which electrically connect into the circuit one or more potential transformers to energized lines. Additionally, the improved switch mechanism of the present invention may be utilized for load-break switch application capable of interrupting load currents, or, in addition, the switch mechanism of the present invention may also be used for actuating non-load-breaking switch members.

The rotatable potential-transformer disconnecting assembly of the present invention has particular application to enclosed switchgear, in which cell units, or cabinets, are utilized, and stacked vertically for metal-enclosed switch-gear assemblies used, for example, in connection with line starters for controlling electrical motors.

10 Claims, 36 Drawing Figures

FIG. I

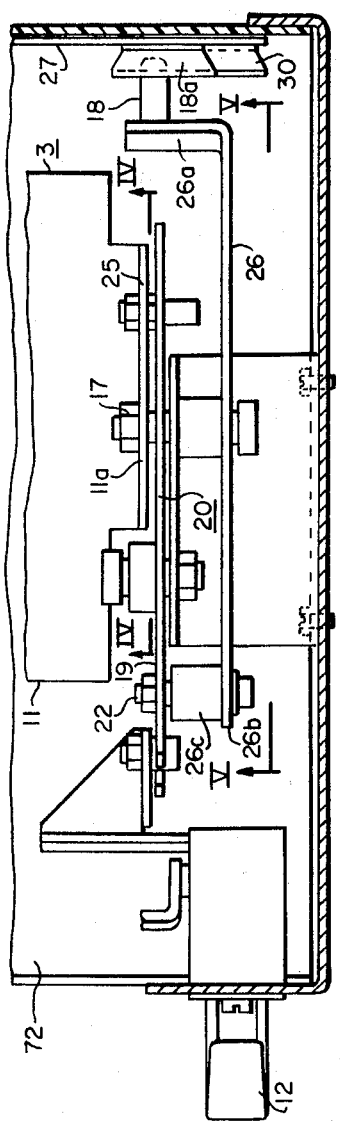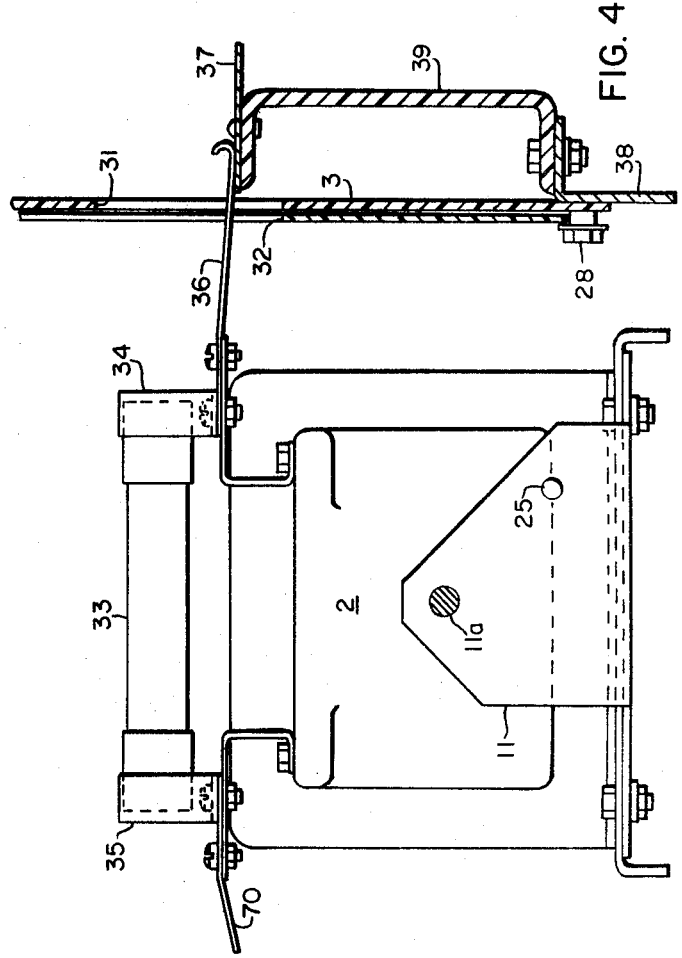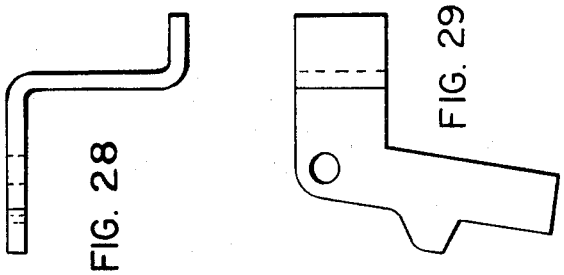

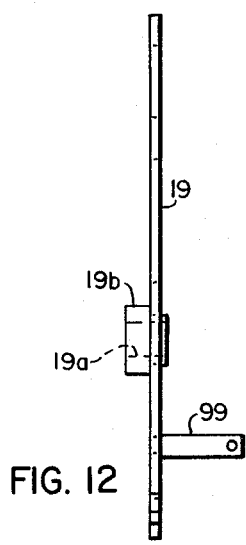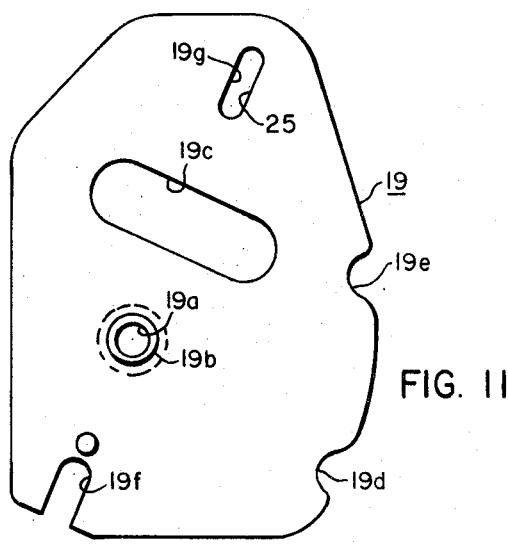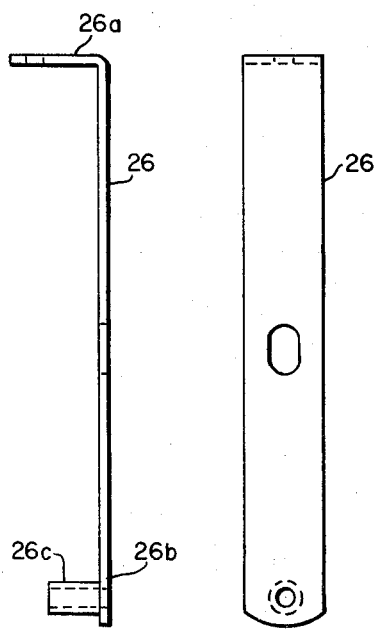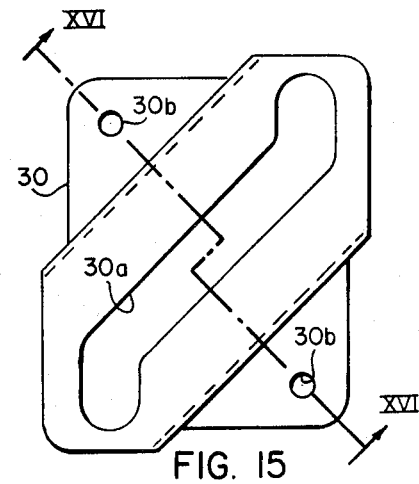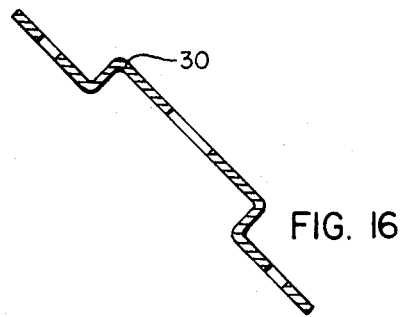

SWITCH-OPERATING MECHANISM WITH PARTICULAR APPLICATION THEREOF TO POTENTIAL-TRANSFORMER DISCONNECTING ASSEMBLY

CROSS-REFERENCES TO RELATED APPLICATIONS

Applicants are not aware of any related applications pertinent to the present invention.

BACKGROUND OF THE INVENTION

It is known in the art to utilize rotatable potential-transformer assemblies within metal-enclosed switchgear. Reference may be had, for example, to U.S. patents J. O. Tjebben—U.S. Pat. No. 3,157,827; to M. Kreekon et al - U.S. Pat. No. 3,052,820. These patents illustrate, generally rotatable types of potential-transformer assemblies, which may be utilized in connection with enclosed switchgear units.

In conjunction with high-voltage motor-control equipment, potential transformers are often required for metering or relaying circuits. Usually, means are provided to disconnect the potential transformers from the line without disrupting power service.

SUMMARY OF THE INVENTION

The present invention is, in part, concerned with a potential-transformer disconnecting assembly mounted upon a rotatable tray, and operated by a unique switch operating mechanism, which functions to rotate both the tray and the carried potential transformers through approximately 90° of rotation to achieve either a connect, or a disconnect function. Access to the fuses, mechanical interlocking, insulating barriers and a shutter mechanism are other important features, which provide the utmost safety for the operator.

The particular switch operating mechanism of the present invention has other applications. For example, it may be used, when desired, for a load-break disconnecting switch, or a non-load-break switch, when desired. There is additionally provided a positive "feel" of the mechanism in the open and closed-circuit positions of the operating mechanism. Moreover, it requires very little space, and may be adapted to various rotative angular throws, when desired. In one of the particular applications illustrated, for example, it is utilized for a 90° rotative throw of a rotatable potential-transformer disconnecting assembly.

According to the present invention, an improved rotatable potential-transformer assembly is provided for metal-enclosed switchgear. Generally, the potential-transformer assembly is rotatably mounted upon a rotatable tray, and is actuated by a switch mechanism of novel construction. Each of the carried potential transformers has a line contact finger, which makes connection with a line terminal in the closed position of the potential-transformer assembly. In the disconnected position of the rotatably-actuated potential-transformer assembly, a grounding contact finger is associated with each of the high-voltage terminals of the potential transformer, so as to positively ground the same in the open rotated disconnected position.

The switch operating mechanism of the present invention may not only be used to effect the actuation of a rotatable potential-transformer disconnecting unit, particularly adapted for enclosed cubicle-cell mounting, but also the switch mechanism is capable of being used with load-break switches, when desired, or, in addition, with non-load-break switches. It provides a positive "feel" of the mechanism in the open and closed positions.

Accordingly, a general object of the present invention is to provide an improved switch-operating mechanism for switch structures.

Still another object of the present invention is to provide an improved rotatable potential-transformer disconnecting assembly, particularly adapted for enclosed cell mounting.

Another object of the present invention is the provision of an improved load-break disconnecting switch utilizing an improved switch-operating mechanism.

Still a further object of the present invention is the provision of an improved non-load-breaking disconnecting switch requiring little space, and having an improved switch operating mechanism.

Still another object of the present invention is the provision of an improved potential-transformer disconnecting assembly having improved accessibility, and providing interlocking safety features for the operating personnel.

Another object of the present invention is the provision of an improved compact switch-operating mechanism, which may translate linear movement of an actuating mechanism, or driving mechanism, such, for example, as an operating-handle output mechanism, into resultant rotary output movement of an output member of various angular throws.

Another object of the present invention is the provision of an improved rotatably-mounted potential-transformer disconnecting assembly, with an improved grounding arrangement in the open-circuit position thereof.

Further objects and advantages will readily become apparent upon reading the following specification, taken in conjunction with the drawings.

BRIEF DESCRIPTION OF THE DRAWINGS

FIG. 4 is a fragmentary vertical sectional view taken substantially along the line IV—IV of FIG. 2, with the switch mechanism in the "ON" position;

FIG. 6 is a fragmentary plan view of the assembly taken along the line VI—VI of FIG. 5, looking in the direction of the arrows;

FIG. 11 is a side elevational view of the driving cam of the improved switch-operating mechanism of the present invention;

FIG. 12 is a top plan view of the driving cam of FIG. 11;

FIG. 13 is a side elevational view of the shutter-operating lever utilized in conjunction with the improved switch-operating mechanism of the present invention;

FIG. 14 is a top plan view of the shutter-operating lever of FIG. 13;

FIG. 15 is a front elevational view of the metallic shutter-guide driving bracket;

FIG. 16 is a sectional view of the shutter-guide driving bracket of FIG. 15, taken along the line XVI—XVI of FIG. 15 looking in the direction of the arrows;

FIGS. 28 and 29 illustrate front and side views of the handle-mechanism door interlock;

DESCRIPTION OF THE PREFERRED EMBODIMENTS

Figure 1:
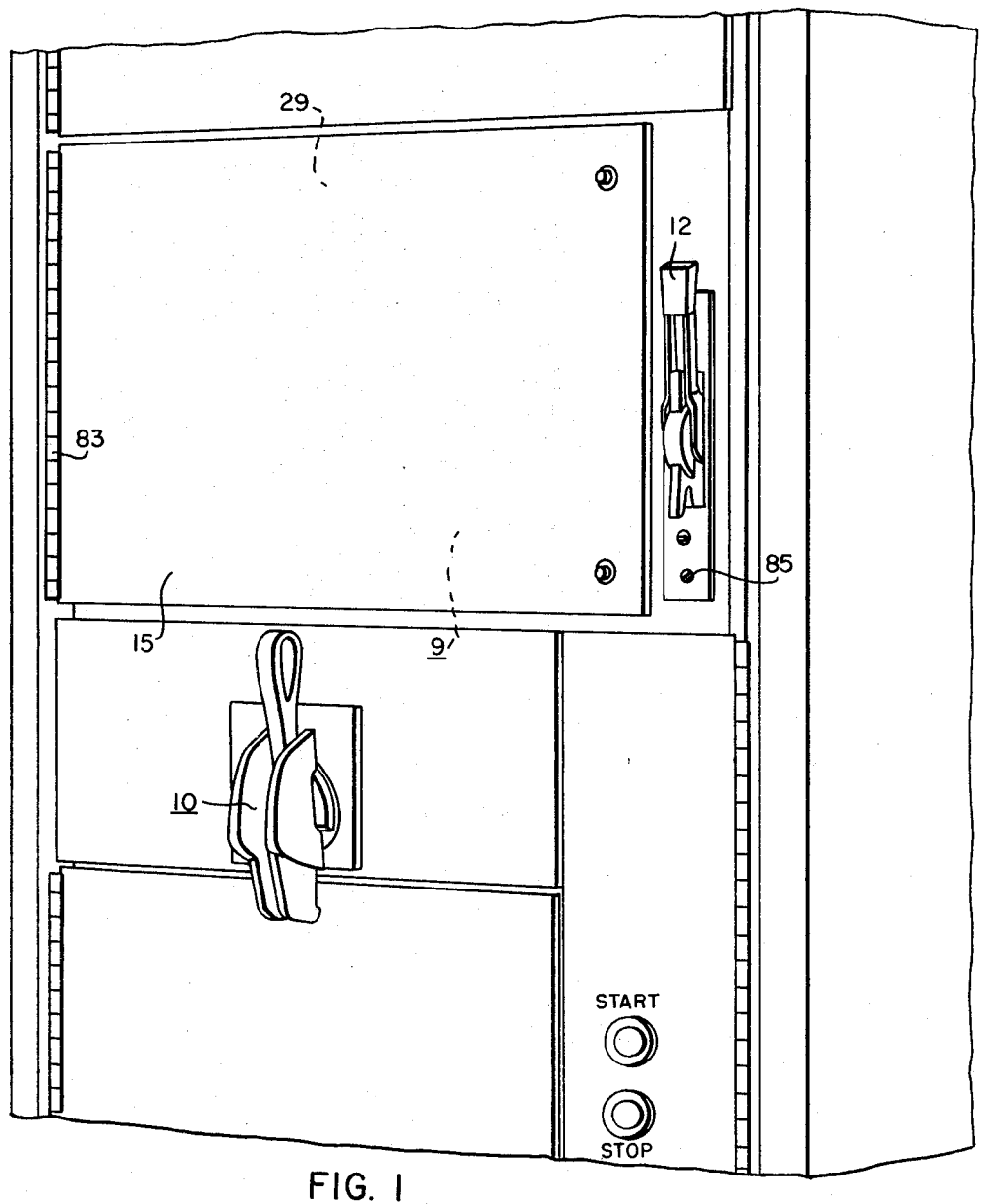
FIG. 1 is a perspective view of the improved potential-transformer disconnecting assembly of the present invention mounted in a switchgear cell enclosure, with the door closed, and the operating handle indicating the potential transformer disconnecting assembly to be in the "ON" position.
Figure 2:
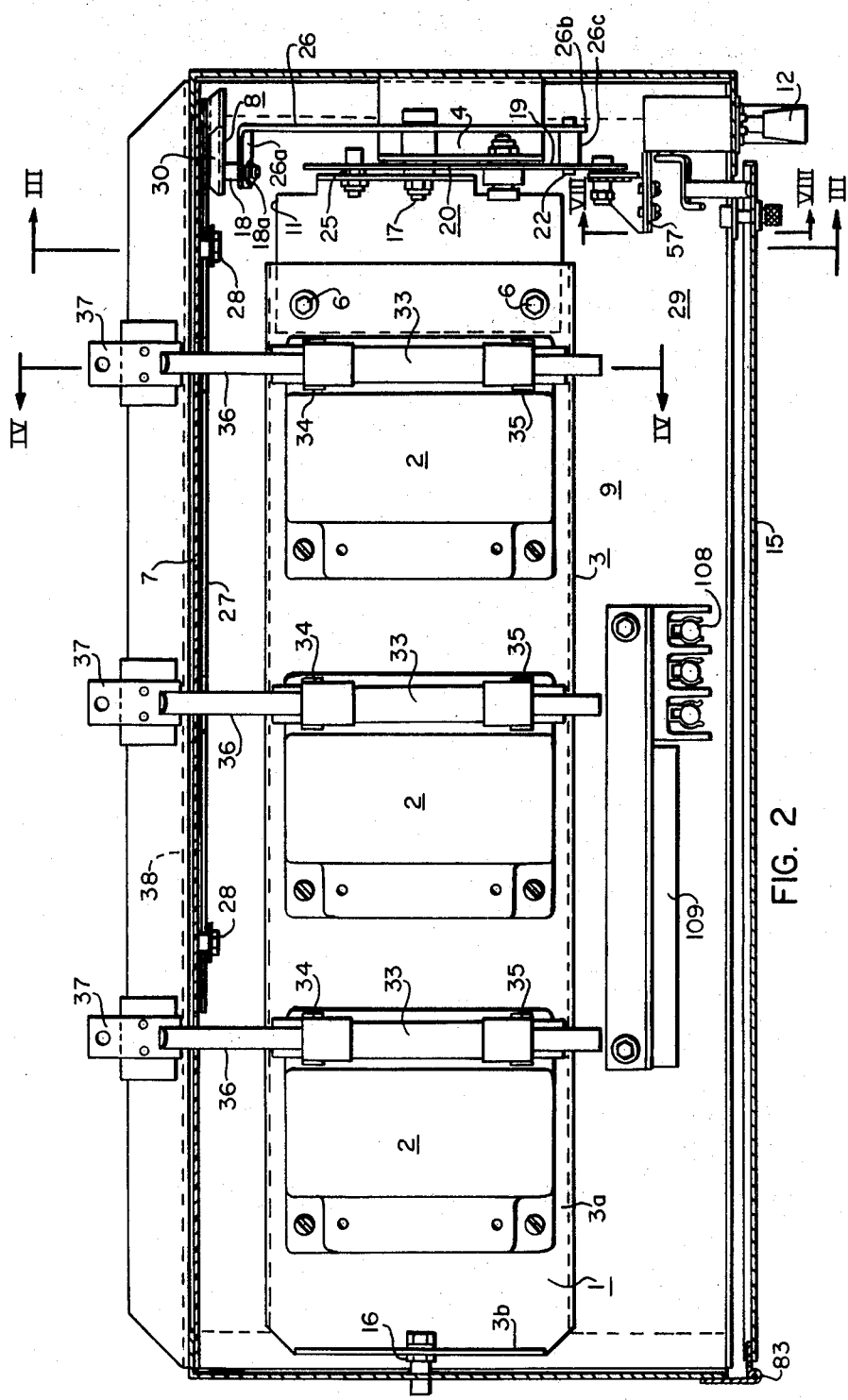
FIG. 2 is an enlarged top plan view of the drawout-type of potential-transformer disconnecting assembly of the present invention, showing the three potential transformers making contacting engagement with the line terminals, and the switch mechanism in the "ON" position.

In conjunction with high-voltage motor-control equipment, potential transformers are often required for metering or relaying circuits. Usually, means are provided to disconnect the potential transformers from the line without disrupting power service. Referring to FIGS. 1 and 2, the present invention is, in part, concerned with a rotatable assembly 1, upon which potential transformers 2 are mounted on a rotatable tray 3, and operated by a switch mechanism 4, more fully described hereinafter, which rotates both the tray 3 and the potential transformers 2, as a unit, through substantially 90° of rotative travel to achieve either a connecting or a disconnecting function. As more fully brought out hereinafter, access is provided to the potential-transformer fuses 33, and mechanical interlocking together with an insulating barrier 7 and a shutter mechanism 8 are provided to insure the utmost safety for the maintenance personnel.

Figure 8:
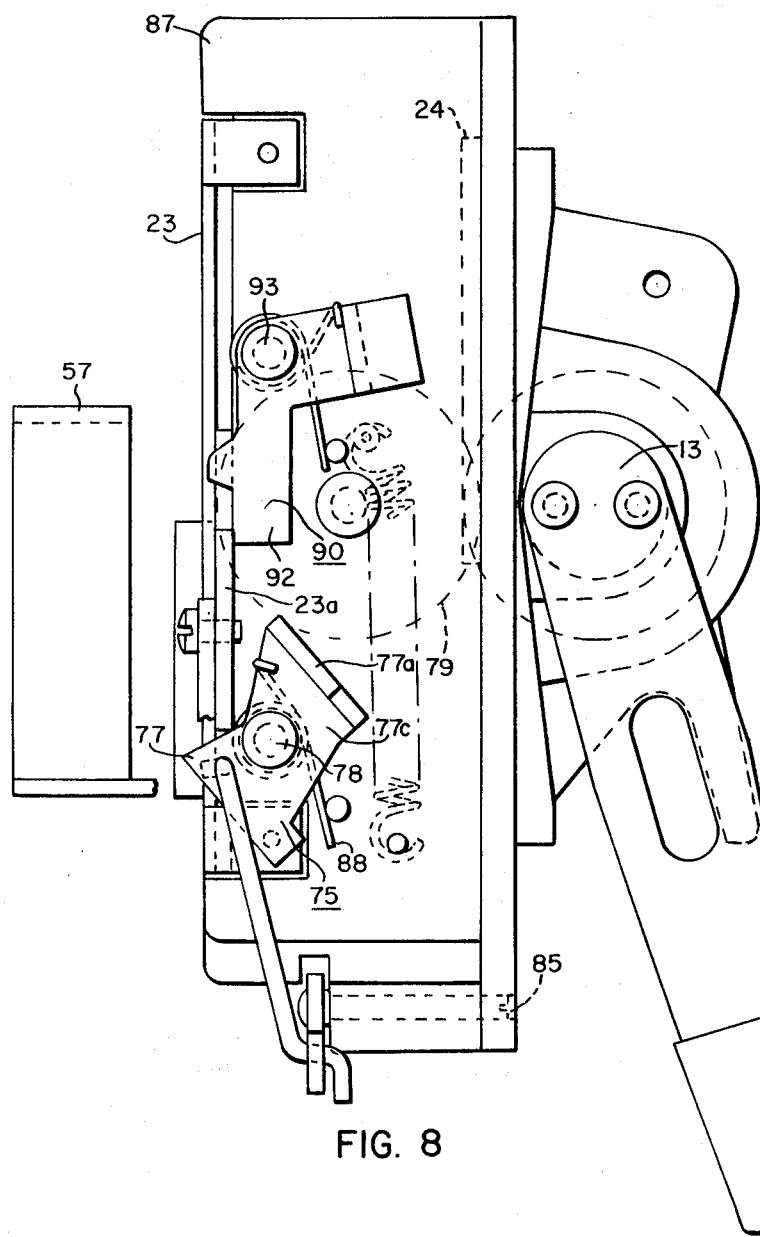
FIG. 8 is an enlarged side elevational view of the operating handle mechanism taken substantially along the line VIII—VIII of FIG. 2, looking in the direction of the arrows, and the handle being shown in the down "OFF" position.

FIG. 1 illustrates, generally, the application of the rotatable potential-transformer disconnecting assembly 9 of the present invention, as applied to enclosed metal-clad switchgear assemblies 10. As shown in FIG. 1, the reference numeral 9 generally designates the potential-transformer disconnecting assembly, being operated by an external manually operable handle 12, which rotates about a fixed pivot 13, and may be padlocked in either the open down position, as shown in FIG. 8, or padlocked in the up closed position, as illustrated in FIG. 1.

The line-starter equipment, not shown, disposed within the cell, immediately below the potential-transformer compartment, may, for example, be of the type set forth in Hodgson, U.S. Pat. No. 3,264,431, issued Aug. 2, 1966. This equipment is additionally described in Clark, Jr. et al - U.S. Pat. No. 3,264,433, issued Aug. 2, 1966. Reference may also be made to U.S. Pat. No. 3,264,432, issued Aug. 2, 1966, to Alfred W. Hodgson and Russell D. Clark, Jr., and to U.S. Clark et al U.S. Pat. No. 3,290,468, issued Dec. 6, 1966, all of the aforesaid four patents being assigned to the same assignee as the instant application.

Figure 3:
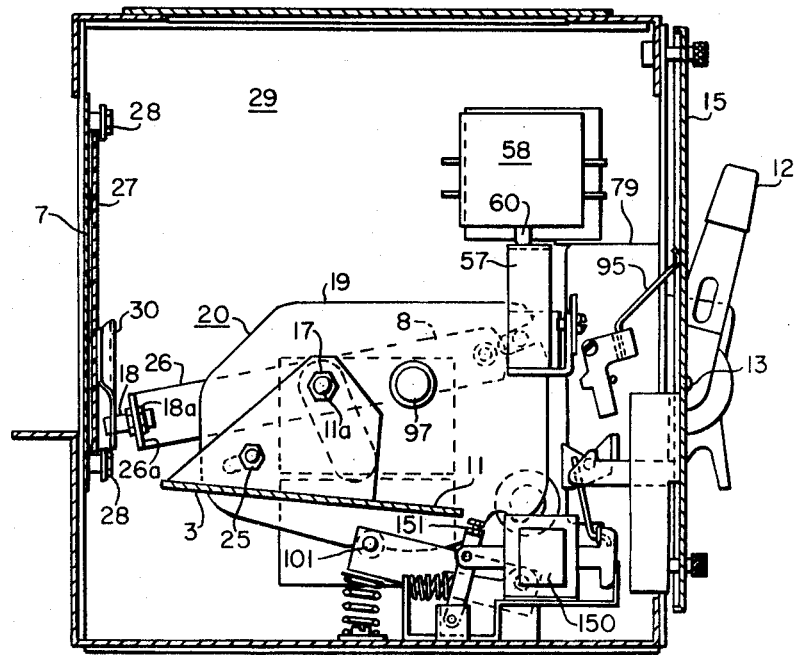
FIG. 3 is a vertical cross-sectional view taken substantially along the line III-III of FIG. 2 looking in the direction of the arrows, with the rotatably-mounted potential-transformer disconnecting assembly being illustrated in the "ON" connected position.

FIG. 2 illustrates the equipment of FIG. 1 with the front cover door 15 opened, and showing, generally, the three potential transformers 2 mounted upon the tray 3, which is rotatably mounted upon fixed pivots 16, 17, and more clearly shown in FIG. 3 of the drawings.

Figure 17:
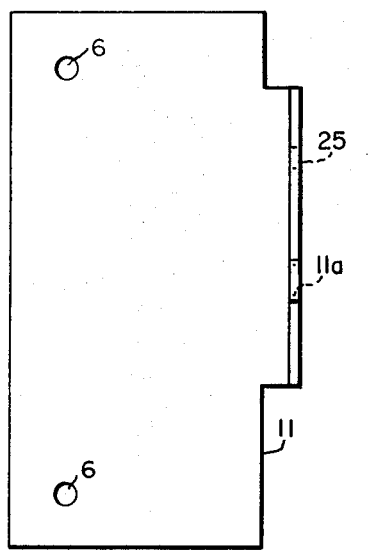
FIG. 17 is a top plan view of the tray-end bearing bracket of the rotatable tray assembly.
Figure 18:
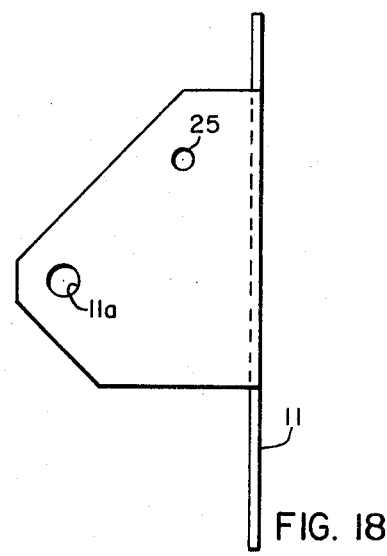
FIG. 18 is an end elevational view of the tray-end bearing bracket of FIG. 17.

The rotatable tray or carriage 3 comprises a flanged channel member 3a having a right-angle bearing bracket portion 3b thereof, as viewed in FIG. 2, which pivots on the stationary pivot 16. The right-hand end of the tray 3 is bolted, as at 6, to a tray-end bearing bracket 11, having a pivot bearing aperture 11a, and shown more clearly in FIGS. 17 and 18 of the drawings.

Figure 9A:
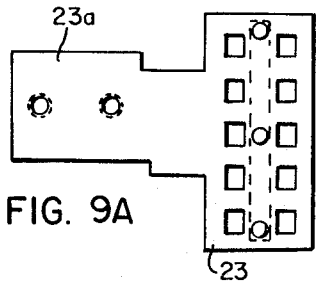
FIG. 9A is an elevational view of the output rack bar of the operating-handle mechanism.
Figure 9B:
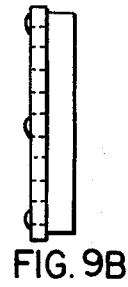
FIG. 9B is a side elevational view of the output rack of FIG. 9A.
Figure 30:
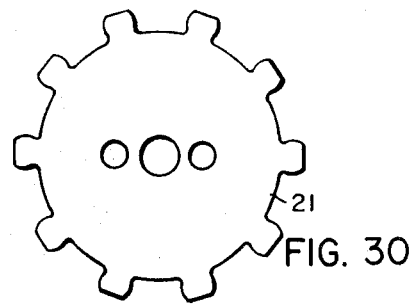
FIG. 30 is a side view of one of the interconnecting gears of the handle mechanism.
Figure 10:
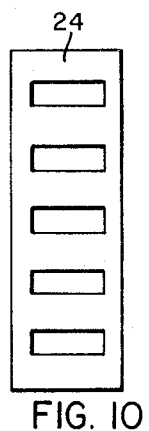
FIG. 10 is an elevational view of the input rack bar of the handle mechanism of FIG. 8.

A main drive cam 19, more particularly illustrated in FIGS. 11 and 12, is utilized to effect opening and closing motions of the rotatably mounted tray assembly 3. An operating-handle mechanism 20 is provided, which, through the intermediary of a plurality of gears 21 (FIG. 30), effects vertical linear movement of two racks 23, 24, more clearly illustrated in FIGS. 9 and 10, to provide the input force to the driving cam 19. As shown in FIG. 6, the driving cam 19 is pivotally connected, as at 25, to the rotatable tray 3. In addition, the driving cam 19 is pivotally connected to a shutter-operating lever 26, the latter being pivotally mounted upon the fixed pivot 17, and effecting lateral opening and closing movements of a movable rear shutter plate 27. The shutter plate 27 is guided by stationary guide pins 28 affixed to the rear insulating wall 7 of the potential-transformer enclosure 29. A cam-follower shutter guide bracket 30 is more clearly illustrated in FIGS. 15 and 16. Thus, rotative movement of the shutter-operating lever 26, as effected by opening and closing movements of the driving cam plate 19, effects, through the interposition of the cam-follower plate 30, lateral opening and closing movements of the rear shutter plate 27 to thereby align the openings 31, 32 provided in the shutter plate 27 and in the rear enclosure wall 7.

In more detail, with reference to FIGS. 2, 3 and 6, a drive pin 18 (FIG. 6) is adjustably affixed by nuts 18a on an angle portion 26a of the shutter-operating lever 26. The extremity 18a (FIG. 6) of the drive pin extends through a cam slot 30a, provided in the cam bracket 30 (FIGS. 15, 16), the latter being affixed by mounting bolts 30b (FIG. 5) to the laterally-movable insulating shutter plate 27.

The other end 26b of the shutter operating lever (FIG. 6) has a bearing sleeve 26c welded thereto, which accommodates a drive pin 22 affixed to, and movable with, the driving cam 19. Thus, counterclockwise rotation of the shutter-operating lever 26, as effected by rotation of the cam driving plate 19, as viewed in FIG. 3, will effect downward camming motion of the drive pin 18 within the angled slot 30a of the cam guide, and thereby laterally move the insulating shutter plate 27 to align the openings 31, 32 to permit entrance therethrough of the main line fingers 36 carried by the tray assembly 3, and more fully described hereinafter.

Figure 7:
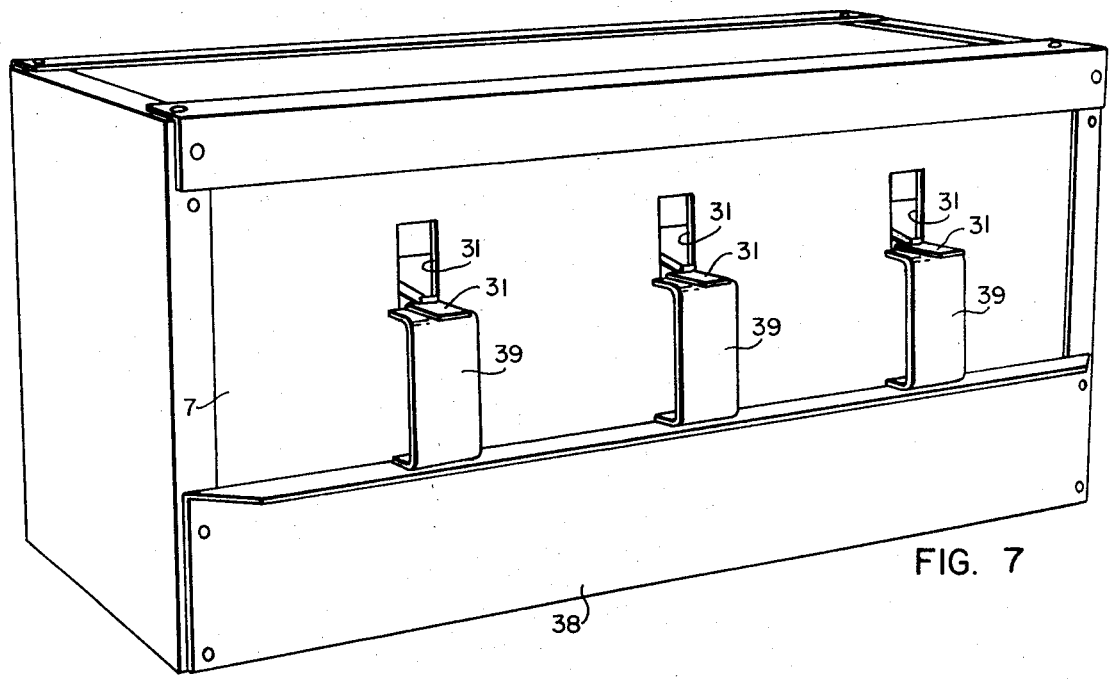
FIG. 7 is a rear view, in perspective, showing the three rear stationary line terminals and the line fingers of the potential-transformer assembly making contacting engagement with the potential-transformer fingers.

The potential transformers 2 have primary fuses 33 mounted in fuse clips 34, 35. The upper fuse clip 34 has a line finger 36, which makes contacting engagement with line terminals 37, affixed to a rear metallic wall 38 (FIG. 4) of the transformer compartment 29 by means of insulating channel-shaped members 39, as illustrated more clearly in FIGS. 4 and 7 of the drawings.

Figure 19:
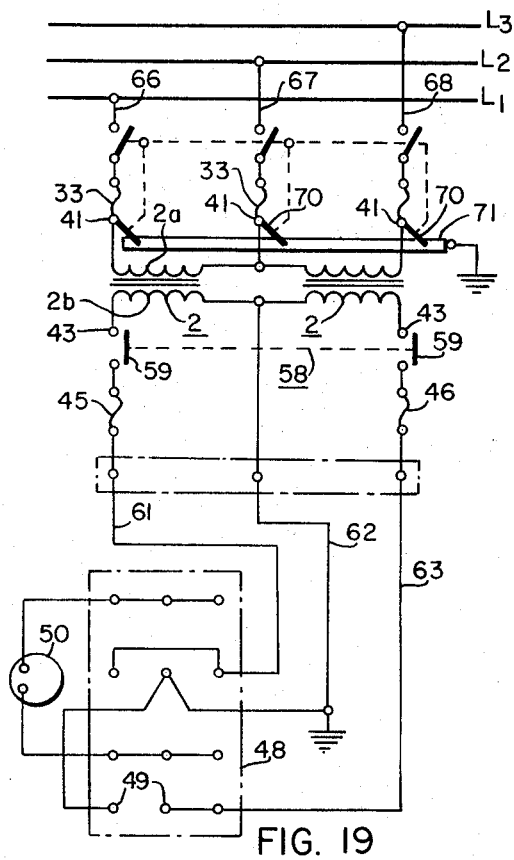
FIG. 19 is a circuit-connection diagram for the potential-transformer assembly of the present invention, indicating two potential transformers in open-delta connection for a typical metering circuit.

The potential-transformer disconnecting assembly 9 may be utilized in connection with high-voltage motor-starter equipment by a number of circuit-connection diagrams, one of which, particularly used for metering circuits, is illustrated in FIG. 19 of the drawings. As shown in FIG. 19, the high-voltage terminals 41 of the potential transformers 2 are connected through primary fuses 33 to the individual lines $L_1$, $L_2$ and $L_3$. The secondary terminals 43 of the two potential transformers 2 are connected through fuses 45 and 46 to a metering panel 48, which comprises a three-position voltmeter switch 49, and the voltmeter 50, as diagrammatically shown in FIG. 19.

Figure 20:
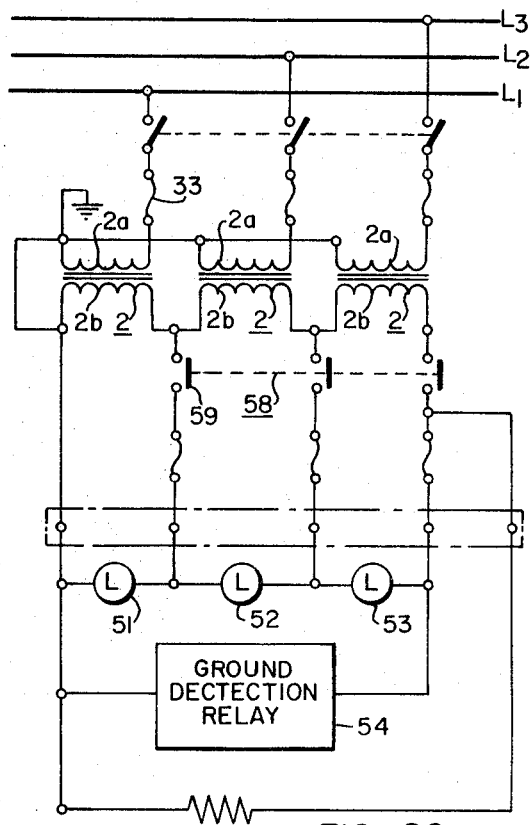
FIG. 20 is another possible connection diagram for the equipment indicating three potential transformers in WYE connection for a typical ground-detection circuit.

Another circuit, using the potential-transformer equipment of the present invention, and which may be used for a typical ground-detection circuit, is illustrated in FIG. 20, and utilizes three potential transformers 2, as shown.

When conditions are normal, and there is no ground connection on any of the three phases $L_1$, $L_2$ and $L_3$, each potential transformer 2 has line-to-neutral voltage applied to its primary 2a, and the secondary voltages are essentially equal. These equal voltages on the secondaries 2b produce the same degree of illumination on the three lamps 51, 52 and 53 connected across the secondaries 2b. In addition, the three equal secondary voltages are 120° apart, resulting in zero net voltage across the delta connection formed by the three secondaries 2b, and there is no voltage across the ground relay 54.

When any one phase is grounded, the potential transformer 2, connected between that phase and ground is essentially shorted, so very little voltage is applied to it. Since there is very little voltage on the primary, there will be very little voltage on the secondary of this transformer. The one lamp connected across this secondary will go out to give a visual indication of the ground. The voltages on the other two transformer primaries 2a now rise to essentially line-to-line voltage, since the faulted phase is at ground potential. This rise in voltage raises the voltage on the two lamps connected to these ungrounded transformers, so they will increase in brightness. Since one transformer secondary voltage is very low, there will no longer be three equal voltages displaced 120°, which add up to zero. Thus, there will now be a resultant, or net voltage across the three secondaries 2b, and this voltage is applied to the relay 54 to energize it, and thereby produce additional notification of the ground condition.

Depending upon the application requirements, potential transformers 2 of the 2,500 volt class, or the 5,000 volt class, for example, may be supplied. These units have their core and coils completely encapsulated, and combine excellent electrical and mechanical properties with a clean smooth appearance. These two voltage-class equipments 2 are identical in size and appearance, and may be mounted in any of the three assemblies 9.

Typical potential transformer data would be as indicated in the table below.

| Type | Voltage Ratio | Freq. | B.I.L. | Thermal Rating |
|---|---|---|---|---|
| PT 2.5 | 2400/120 | 60 Hz. | 45 KV | 450 V.A. |
| PTB | 4200/120 | 60 Hz. | 45 KV | 450 V.A. |

OPERATION

During the closing stroke, as the operating handle 12 is manually moved from the downward "OFF" position to the upward "ON" position, the potential transformers 2 and the tray 3 rotate as a unit, and an insulating shutter plate 27, mounted on the rear barrier member 7, slides laterally open. After the shutter plate 27 opens, the flexible line fingers 36, mounted upon the potential transformers 2, pass through the openings 31 in the barrier 7, and make contacting engagement with the line terminals 37. The "wiping" action of the fingers 36 upon the line terminals 37 insures good electrical contact therewith. Immediately after the line fingers 36 make contact, the interlock lever 57 (FIG. 3), carried with the output rack member 23a, operates the electrical interlocks 59 (FIGS. 3 and 19), and the transformer secondary circuits 61, 62, 63 (FIG. 19) are closed.

In more detail, a spring-biased-open switch 58 has a pair of spring-biased-open interlock contacts 59, which are mechanically forced to an upward closed position by an angle bracket 57 striking a plunger 60 connected to the bridging members of the contacts 59. This mechanical forced closing of the normally open contacts 59 occurs near the end of the upward closing movement of the output rack-bar 23a (FIG. 9A), and thereby closes the potential-transformer secondary circuits 61, 62, 63 (FIG. 19) after the previous closing of the primary circuits 66, 67, 68 (FIG. 19).

Figure 26:
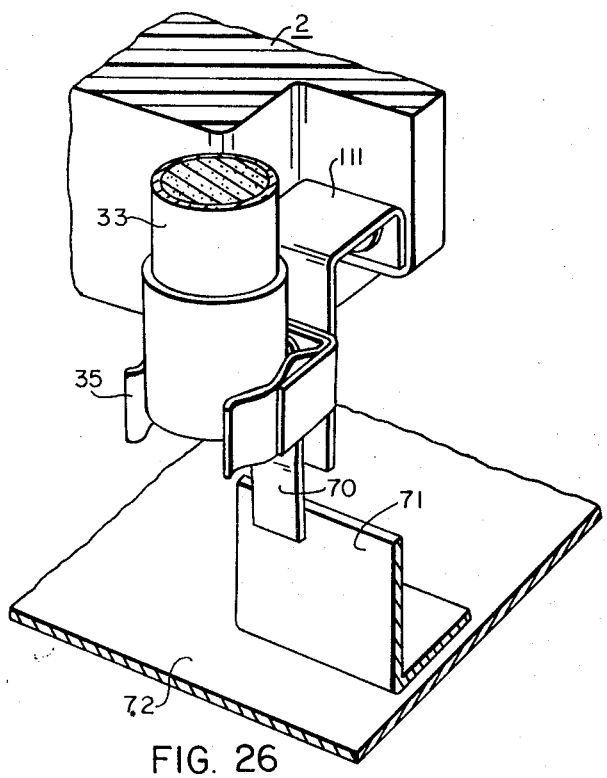
FIG. 26 is an enlarged detail fragmentary view showing the primary fuse and high-voltage terminal of each potential transformer grounded to the grounding bar in the open position of the switch mechanism.

During the opening stroke, as the handle 12 is moved from the upward "ON" position to the downward "OFF" position, the electrical interlock contacts 59 open, and unload the transformer secondary circuits 61, 62, 63 before the primary line contacts 36 separate from the line contacts 37. This limits the arcing at the line contacts 37 to the transformer primary magnetizing current only. As the handle 12 is rotated further, the line contacts 36, 37 separate; and the insulating shutter plate 27 closes to isolate the line terminals 37 from the potential-transformer compartment 29. When the potential-transformer tray assembly 3 reaches the "OFF" position, the flexible fingers 70 ground the line fingers 36 to the grounding bar 71 (FIG. 26). The latter is welded to the grounded base plate 72 of the cabinet 29 to ensure a good grounding connection.

DOOR SAFETY INTERLOCKS

The first door safety interlock 75 (FIG. 8) prevents the potential-transformer cell door 15 from being opened, when the operating handle 12 is in the upward "ON" position. This is achieved by means of a latch 77 carried by the handle mechanism 79, which engages a catch 80 mounted upon the door 15, as shown more clearly in FIG. 27.

Figure 32:
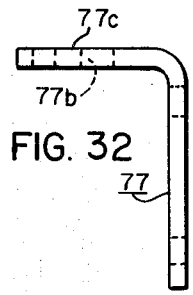
FIGS. 31-33 are detail views of the latch interlock on the handle mechanism to prevent the door being opened when the handle is in the "ON" position; and, FIGS. 34 and 35 are perspective views of an application of the improved switch-operating mechanism of the present invention, as applied to a knife-blade disconnecting switch, and shown in the closed-circuit position thereof.
Figure 31:
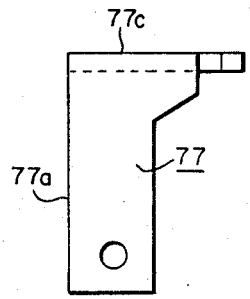
Figure 33:
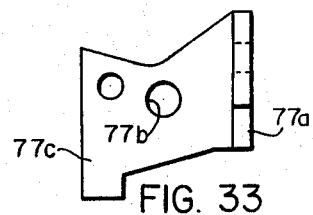
Figure 27:
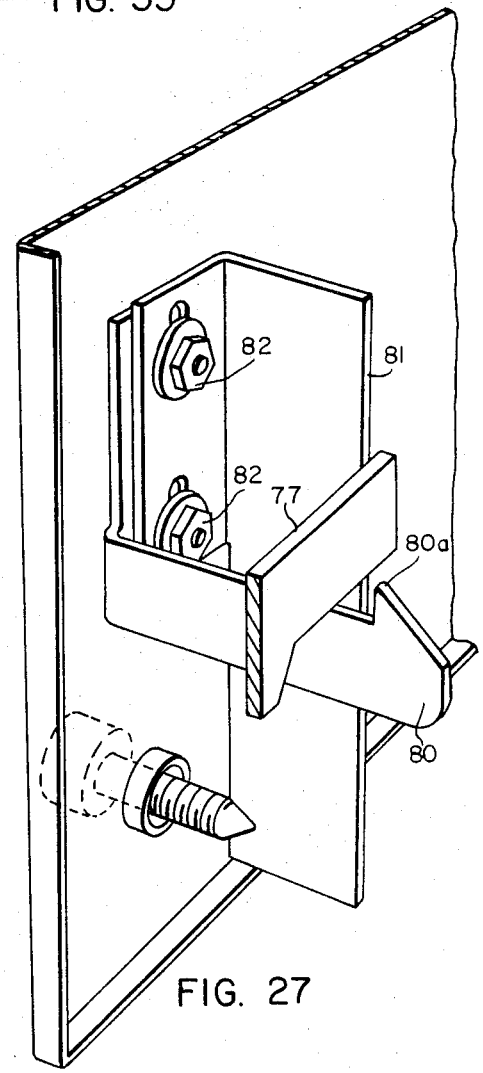
FIG. 27 illustrates, in perspective, the door safety interlock including a latch moving with the free end of the cabinet door.

The latch 77 has a configuration more clearly shown in FIGS. 31-33 of the drawings. Generally, it is angled to present a latching portion 77a, which latches the "nose" 80a of the door catch 80, as shown in FIG. 27. In addition, it is provided with a pivot aperture 77b to accommodate a pivot pin 78 protruding from the side of the housing 87 of the handle mechanism 79. As shown more clearly in FIG. 8, a coil spring 88 biases the latch 77 in a clockwise direction about the pivot pin 78. In the "OFF" down position of the handle mechanism 79, as shown in FIG. 8, the output rack bar 23a cams the body portion 77c in a counterclockwise direction, as viewed in FIG. 8, to release the catch 80 attached to the cabinet door 15.

A bracket 81, mounted along side, and held by the same screws 82, prevents any attempt to force the hinges 83, and pry the door 15 down and open. On the other hand, if it is absolutely necessary, this interlock 75 can be "cheated" by using the "cheating" screw 85 (FIG. 8) located just above the "OFF" notation on the operating-handle dress plate. A slight counterclockwise rotation of the "cheater" screw 85 disengages the door interlock 75.

The second door safety interlock 90 prevents movement of the operating handle 12 from the downward "OFF" position to the upward "ON" position, while the door 15 is open. This is achieved by means of a latch 92 (FIG. 8), which engages the handle-mechanism output bar 23a. The latch 92 is pivotally mounted, as at 93, to the mechanism housing 87 and biased by a spring 94 in a clockwise direction. The latch 92 has a defeater spring 95 (FIG. 3), which, as the door 15 is closed and fastened, releases the interlock 90 by rotation of the latch 92. This interlock, too, can be deliberately "cheated," by pushing in the defeater spring 95 by hand.

FIGS. 11 and 12 show, in detail, the configuration of the actuating driving cam 19. It will be noted that the driving cam 19 has a pivot aperture 19a, including a hub portion 19b, which accommodates the stationary pivot pin 97. In addition, the driving cam 19 has an elongated slot 19c provided therein to accommodate the stationary pivot 17 for the rotatable tray 3 carrying the potential transformers 2. Also, the driving cam 19 carries a pin 99, which actuates one end 26b of the shutter lever 26. The function of the slot 19c, relative to the stationary pivot 17 for the rotatable tray 3, can be more readily seen in FIG. 3 of the drawings.

Figure 5:
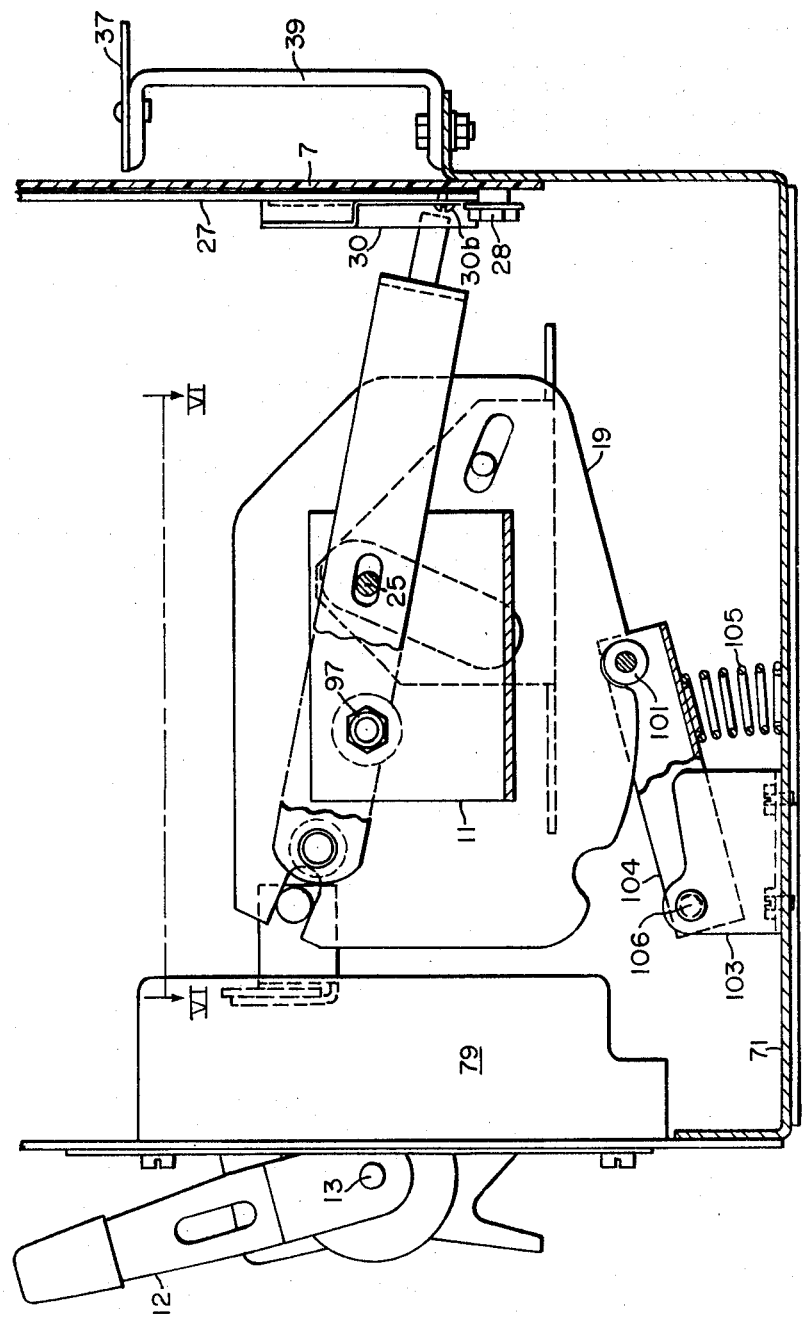
FIG. 5 is a vertical sectional view taken along the line V—V of FIG. 6 with the switch mechanism in the "ON" position.

To provide a positive "feel" for the open and closed positions of the driving cam 19, detents 19d and 19e are provided, which accommodate a spring-biased roller 101 carried by a pivot bracket 103. The roller 101 is pivoted upon a lever 104 biased by a spring 105 about a pivot shaft 106 (FIG. 5). This assists in maintaining the operating mechanism 20 in either the open or in the closed positions.

Additionally, the actuating drive cam 19 carries a slot 19f, which accommodates the linear travel of the input bar 57. The input bar 57 carries a lateral driving pin 57a. Due to the circular motion, the driving cam 19 also has an elongated slot 19g provided in the rear end thereof to accommodate the actuating pin 25 for the rotatable tray 3.

As shown in FIGS. 2 and 3 of the drawings, fuses 108 are provided for the secondary leads of the three potential transformers 2, and a terminal block 109 is provided for assisting in making the secondary connections.

FIG. 26 more clearly shows the organization for the lower fuse clip 35, which is directly connected to the high-voltage terminal 111 of the potential transformer 2, and the grounding finger 70, which is additionally secured thereto. The arrangement is such, as shown in FIG. 26, to ground the high-voltage terminals 111 of the potential transformer 2 in the fully open position of the potential-transformer disconnecting assembly 9, as shown in FIGS. 2 and 26.

Figure 25:
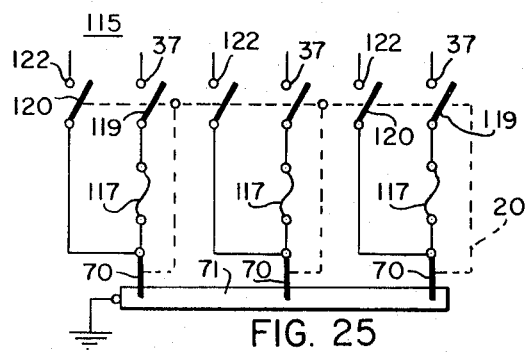
FIG. 25 is a circuit-connection diagram for the load-break feeder switch of FIG. 24.
Figure 24:
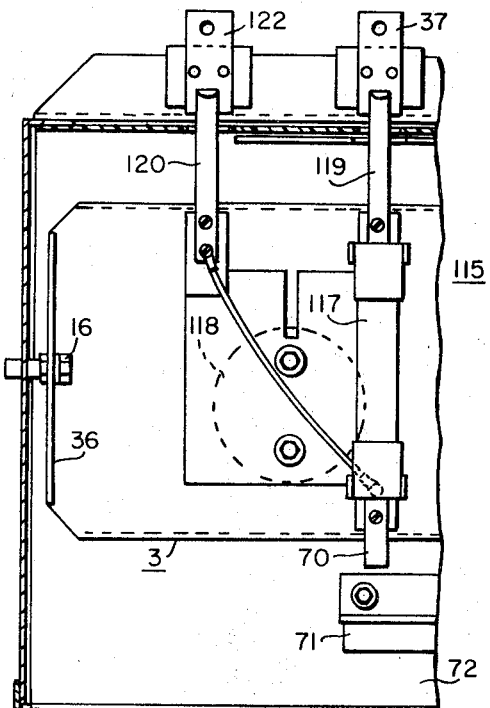
FIG. 24 is a fragmentary top plan view of a load-break feeder switch having fuses, utilizing the improved switch-operating mechanism of the present invention, with the device shown in the "ON" position.

FIGS. 24 and 25 illustrate an application of the improved operating mechanism 20 of the present invention, as provided with a load-break feeder switch 115 supplied with fuses 117. As shown in FIG. 24, the rotatable tray 3 is again provided, carrying therewith, upon insulating posts 118, the line and feeder fingers 119, 120 interconnected by a fuse 117 of proper rating. As will be obvious, in the closed position, (as shown in FIG. 24) a feeder circuit is provided between the line terminals 37 and the feeder terminals 122, as illustrated by the diagrammatic view of FIG. 25.

Figure 23:
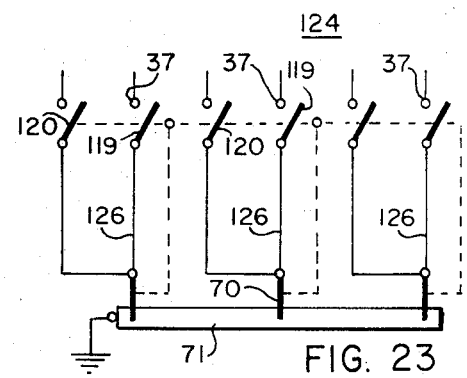
FIG. 23 is a circuit diagram of the non-load-break switch of FIG. 22.
Figure 22:
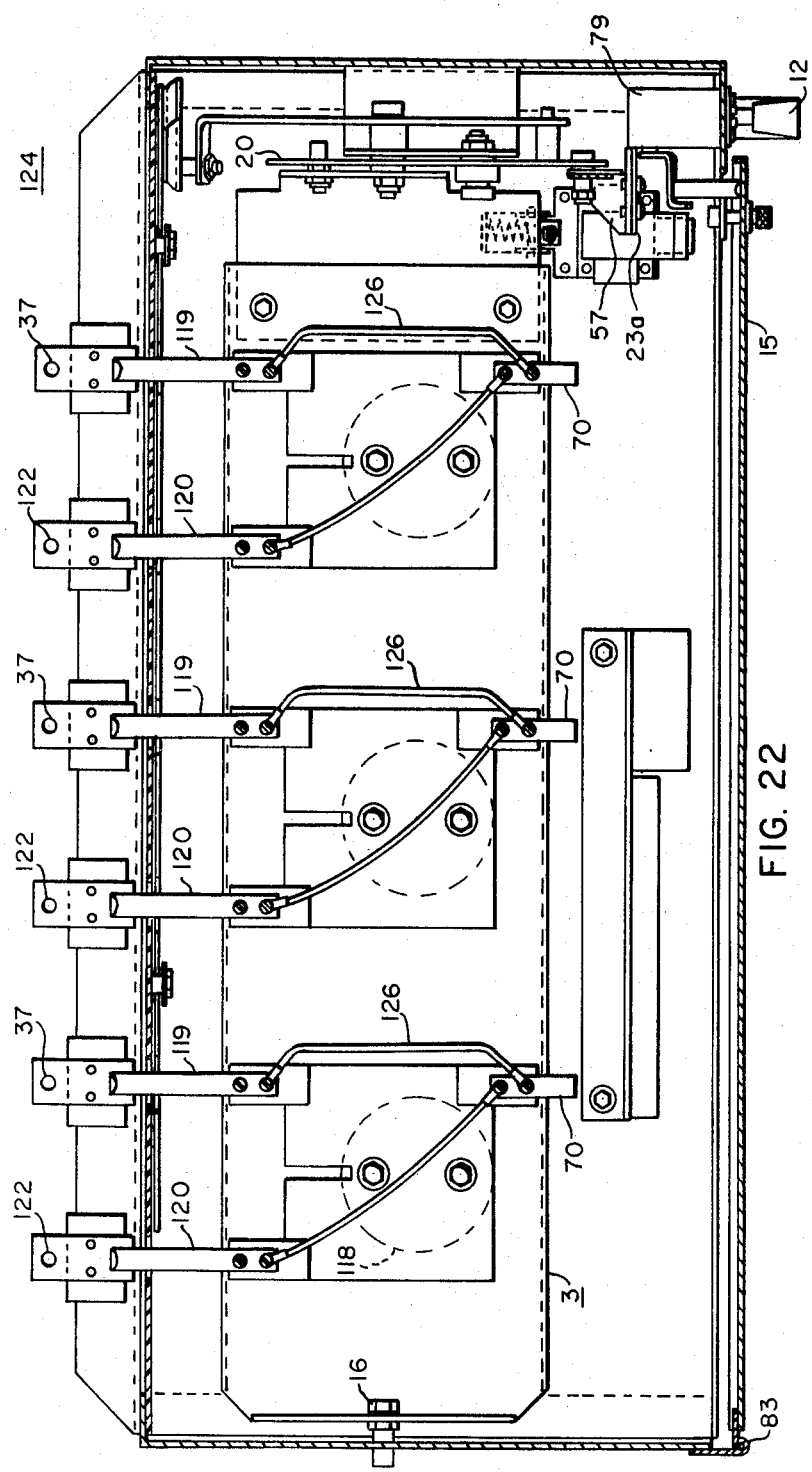
FIG. 22 is a top plan view of a non-load-break disconnecting switch omitting the fuses, the latter of which may be in a remote location.

In addition, the improved mechanism 20 of the present application may be supplied with a non-load-break disconnecting switch 124 (FIG. 22), in which the fuses may be provided at a remote location. In other words, for the desired capacity fuses, they may be of such size, as to be inconvenient to mount them within the switch enclosure 29, and may be more advantageously located at a remote point. A shorting lead 126 may take the place of the fuses 117, as used in the load-break switch of FIG. 24. FIG. 23 is a diagrammatic view of the arrangement. In both feeder switches 115, 124 of FIGS. 22 and 24, the device may be grounded by means of the grounding fingers 70 and the grounding bar 71, as was the case with the potential-transformer disconnecting assembly 9 of FIG. 3.

Figure 34:
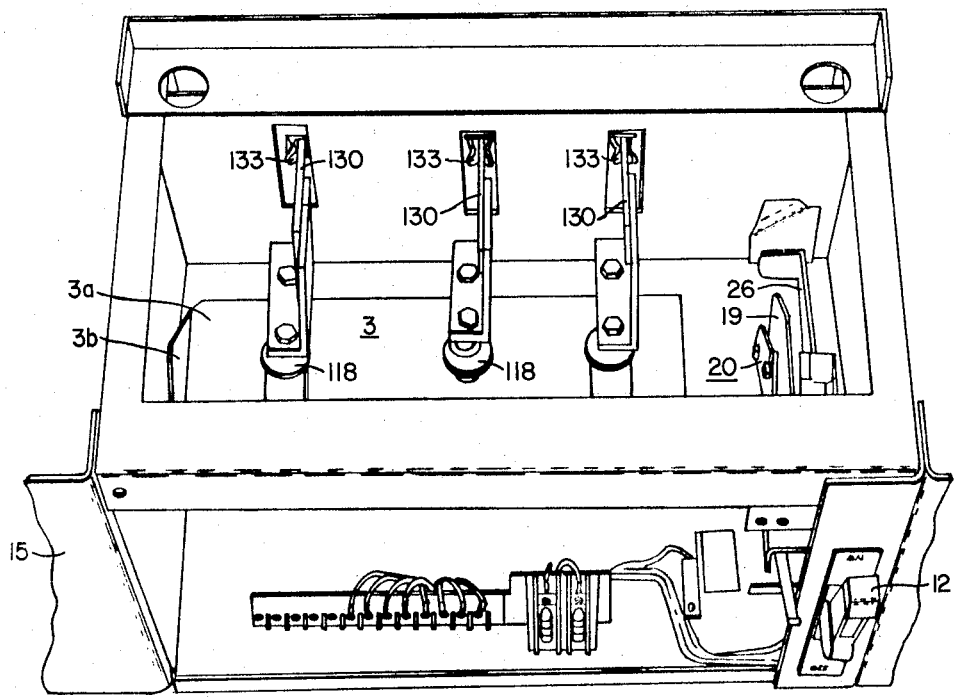
Figure 35:
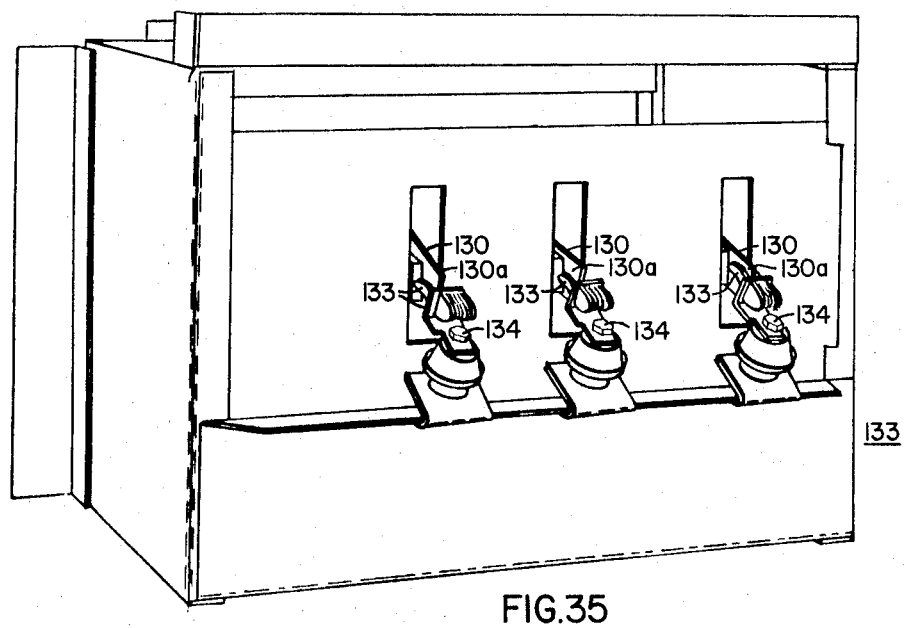

FIGS. 34 and 35 illustrates an application of the improved operating mechanism 20 with a knife-switch type of disconnecting switch. As illustrated in FIGS. 34 and 35, it will be seen that the rotatable tray 3 carries, through post insulators 118, the moving disconnecting blades 130 of a disconnecting switch 131. As will be obvious, during the closing travel of the rotatable tray 3, as effected by the operating mechanism 20, the free ends 130a of the movable knife-type blades 130 will engage between the stationary fingers 133 of the line terminals 134, as more clearly shown in FIG. 35 of the drawings. The same mechanism 20 may be used in this application.

Figure 21:
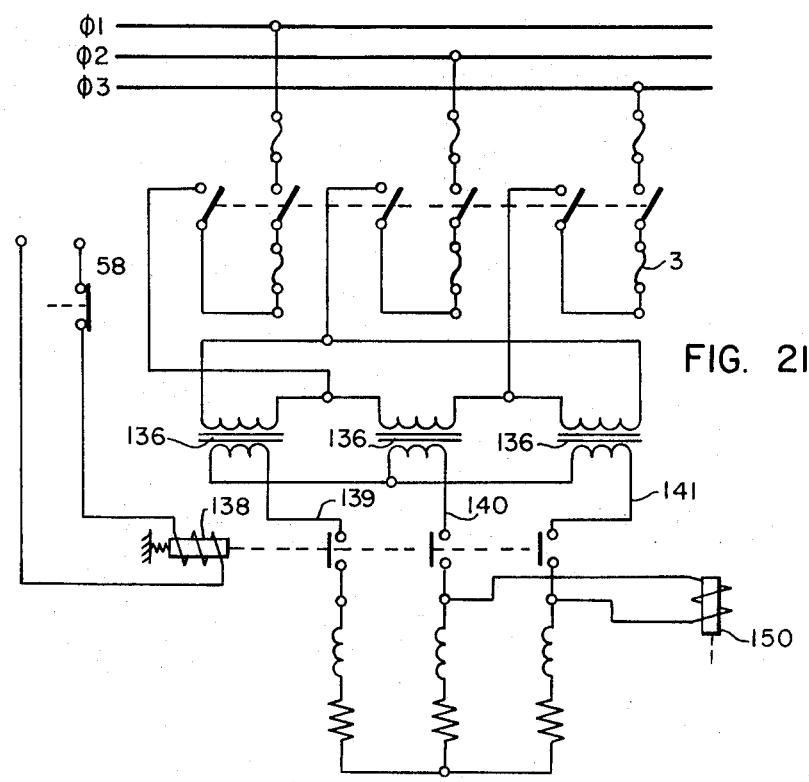
FIG. 21 is a typical circuit-connection diagram in which the potential transformers are of relatively large size and are located at a remote position, and a lock-in device for the tray assembly is used, being energized by the potential-transformer secondary circuits.

In an application of the switch shown in FIGS. 34 and 35, the transformer may be of the power type rather than of the metering type, and may be too large to fit within the enclosure, and their secondary load currents too high to be handled by a device of the type shown as switch 58. In such a case, the transformers 136 (FIG. 21) are mounted remotely and the circuits arranged as shown in FIG. 21, wherein the contactor or relay device 58 energizes or deenergizes a contactor coil 138. The contactor 138 is connected in the transformer secondary circuit to open and close the same. During the opening stroke, as the handle 12 is moved from the "ON" to the "OFF" position, the electrical interlock contacts (59) open, deenergizing the contactor 138 and thus opening the transformer secondary circuit 139–141. An additional safety feature comprising a solenoid (150) (FIG. 3) can be added under these circumstances, such that opening of the transformer secondary circuit 139–141 deenergizes the solenoid 150 and removes an interference plunger 151 positioned under the tray assembly 3, thus permitting rotation of the tray 3 to the open position. If the transformer secondary circuit 139–141 is not opened, the extended plunger 151 would prevent tray rotation.

From the foregoing description, it will be apparent that there has been provided an improved operating mechanism 20 for a switch construction. This improved operating mechanism 20 has particular applicability with a potential-transformer disconnecting assembly 9, as illustrated in FIGS. 1 and 2, but may, additionally, be used with other switch constructions, as illustrated in FIGS. 22, 24 and 34 and 35. The driving cam 19 may be arranged to effect different angular throws, depending upon the amount of rotation desired of the tray 3. Also, a positive indication of the open and closed positions of the mechanism 20 are provided by the detents and the spring-biased roller assembly 101.

To prevent the opening of the operating mechanism 20, when the secondary interlock circuits are provided at a remote location, an interference device, comprising a solenoid 150 is arranged to be energized by the transformer secondary circuits. Thus, the secondary circuits must be deenergized by a circuit connection, such as illustrated in FIG. 21, before the solenoid 150 is deenergized, and removes the interference plunger 151, the latter being positioned, when extended, under the tray assembly 3.

From the foregoing description, it will be apparent that there is provided an improved operating mechanism, an improved potential-transformer disconnecting assembly of increased accessibility for the several parts thereof, with various safety features for the protection of the operating personnel.

Although there has been illustrated and described specific structures, it is to be clearly understood that the same were merely for the purpose of illustration, and that changes and modifications may readily be made therein by those skilled in the art, without departing from the spirit and scope of the invention.

We claim:

1. A potential-transformer disconnecting assembly including a rotatably mounted tray, one or more potential transformers carried by said rotatably mounted tray, an actuating member, a driving cam-plate member, means pivotally mounting said driving cam-plate member for rotative movement about a fixed pivot, means engaging the actuating member with the rotatably-mounted driving cam-plate member for effecting the rotation of the cam-plate member about said fixed pivot, means pivotally mounting the tray member for rotative movement about a second fixed pivot, and means carried by said driving cam-plate member for engaging said rotatably mounted tray for effecting the rotation thereof about said second fixed pivot.

2. The combination according to claim 1, wherein a line contact finger is associated with each potential transformer, a line contact is aligned with each potential-transformer contact finger, and the line fingers make contacting and disengaging motions relative to the line contacts.

3. The combination according to claim 1, wherein a movable shutter member is provided, and a shutter-operating lever is pivotally mounted upon a fixed pivot and has one end thereof moved by rotative movement of said cam-plate member.

4. Metal-clad switchgear comprising, in combination, means defining a plurality of line terminals, metallic cell means having an insulating barrier member with a plurality of openings at the rear side of the cell means, a potential-transformer disconnecting switch assembly disposed within the cell and comprising a rotatably-mounted tray carrying a plurality of potential transformers having line fingers associated therewith, an insulating shutter member contiguously disposed and sliding relevant to said insulating barrier member and having a plurality of openings therein, an operating mechanism for said potential-transformer assembly including an actuating member, a driving member, means pivotally mounting the driving member for rotative movement upon a fixed pivot, means engaging the actuating member with the rotatably-mounted driving member for effecting the rotation thereof about said fixed pivot, means for pivotally mounting the tray member about a fixed pivot, means carried by said driving member for engaging said rotatably-mounted tray member to effect the rotation of the tray member and thereby effect engagement and disengagement of the respective potential-transformer contact fingers with line terminals, a shutter-operating lever pivotally mounted upon a fixed pivot, means carried by the movable driving member for rotating the free end of the shutter lever during the opening and closing movements of the driving member, and means interconnecting the other end of the shutter-operating lever with said movable shutter member so that the shutter member will move and effect alignment of the openings during the closing operation of the driving member.

5. The combination according to claim 4, wherein the driving member is a driving cam-plate member, and the interconnecting means comprises a cam-slot member carried by the movable shutter member.

6. The combination according to claim 5, wherein the cam-plate member has a pair of spaced detent portions provided thereon, and a spring-biased roller assembly positively engages said detent portions in the open and closed positions of the driving cam-plate member.

7. Metal-clad switchgear apparatus comprising, in combination, means defining a potential-transformer compartment having a front door and a rear insulating barrier member with a plurality of spaced openings therein, a movable shutter plate having spaced openings therein which removably registers with the first said openings, means mounting a plurality of line terminals behind said barrier member, a pivotally-mounted tray having a plurality of potential transformers secured thereto and rotatable therewith, each potential transformer having a contact finger which removably projects through a registered opening and contacts one of said line terminals, operating means for said pivotally-mounted tray for effecting the rotation thereof and simultaneous movement of the movable shutter, whereby the potential transformers are removably connected to the line terminals for metering or relaying purposes and when disconnected the shutter means will close to prevent accidental contact with said energized line terminals.

8. The combination of claim 7, wherein the shutter plate moves laterally, and the operating means includes a rotatable driving cam plate.

9. The combination of claim 8, wherein the driving cam plate also rotates a pivotally mounted shutter-operating lever.

10. The combination of claim 7, wherein the door is interlocked with the operating mechanism so that the door cannot be opened when the fingers are in engagement with the spaced line terminals.

* * * * *